United States Patent [19]

Herman

[11] 3,813,786

[45] June 4, 1974

[54] GAUGE ADAPTER

[76] Inventor: Martin Andrew Herman, 2085 114st St., Cleveland, Ohio 44102

[22] Filed: Jan. 18, 1972

[21] Appl. No.: 218,764

[52] U.S. Cl. .............................................. 33/174 P
[51] Int. Cl. .......................... G01b 3/00, B23q 3/00
[58] Field of Search ........ 33/174 P, 174 PA, 174 T, 33/174 TA, 174 TB, 174 R, 174 P

[56] References Cited
UNITED STATES PATENTS

| 2,964,850 | 12/1960 | Herman | 33/174 PB |
| 3,186,095 | 6/1965 | Woodruffe-Peacock | 33/174 R |
| 3,639,992 | 2/1972 | Dabrush et al. | 33/174 PA |

FOREIGN PATENTS OR APPLICATIONS

| 66,194 | 1/1948 | Denmark | 33/174 |

Primary Examiner—John W. Huckert
Assistant Examiner—Jon W. Henry
Attorney, Agent, or Firm—Oldham & Oldham Co.

[57] ABSTRACT

A gauge adapter for use on a gauge having a base with a test article positioning means thereon to position a test article in an up-right position, and an upright secured to the base. A support means forms a part of the gauge adapter and is attachable to the upright and rotatably positions a support arm which extends therefrom. A locater pin is resiliently carried by the support arm and is perpendicular there-to to be positioned for movement in an arc in a vertical plane including the center line of the test article, the locater pin being engageable with the upper end of the test article.

The gauge adapter of the invention is particularly adapted for use as an attachment to any of various types of gauges in existence today and is particularly provided to permit slight arcuate movement of the test article on its center line to facilitate gauging actions on the article.

6 Claims, 4 Drawing Figures

PATENTED JUN 4 1974 3,813,786

GAUGE ADAPTER

BACKGROUND OF THE INVENTION

This invention relates to the gauging of articles, usually elongate articles such as buckets or blades for turbine engines, and in general relates to the type of a universal guillotine gauge as shown in my prior U.S. Pat. Nos. 2,999,282 and 2,964,850.

The adapter of the invention is provided to facilitate the gauging action on an elongated test article and particularly to permit slight adjustment in positioning articles in the gauge for test action.

The general object of the present invention is to provide a gauge adapter to facilitate and improve gauging action in upright styles of gauges and to permit limited movement of the test article while retained on a center line position in the gauge.

A further object of the invention is to provide a relatively simple uncomplicated and inexpensive gauge adapter for permitting slight controlled movement of the upper portion of a test article in a plane including its center line while the article is positioned in a gauge.

The foregoing and other objects and advantages of the invention will be made more apparent as the specification proceeds.

Reference is now made to the accompanying drawings wherein.

When referring to corresponding members shown in the drawings and referred to in the specification, corresponding numerals are used to facilitate comparison therebetween.

SUMMARY OF THE INVENTION

Figure 1:
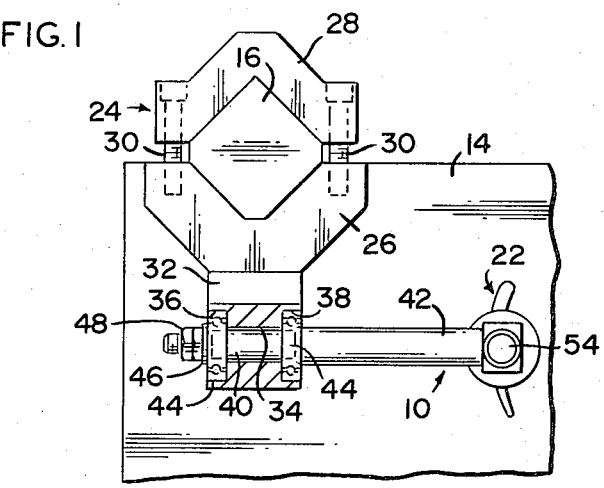
FIG. 1 is a fragmentary plan view, partly in section, of a gauge having a gauge adapter embodying the principles of the invention associated therewith.
Figure 4:
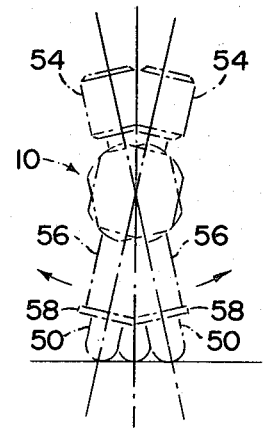
FIG. 4 is a diagrammatic view showing the movement of the gauge adapter.
Figure 2:
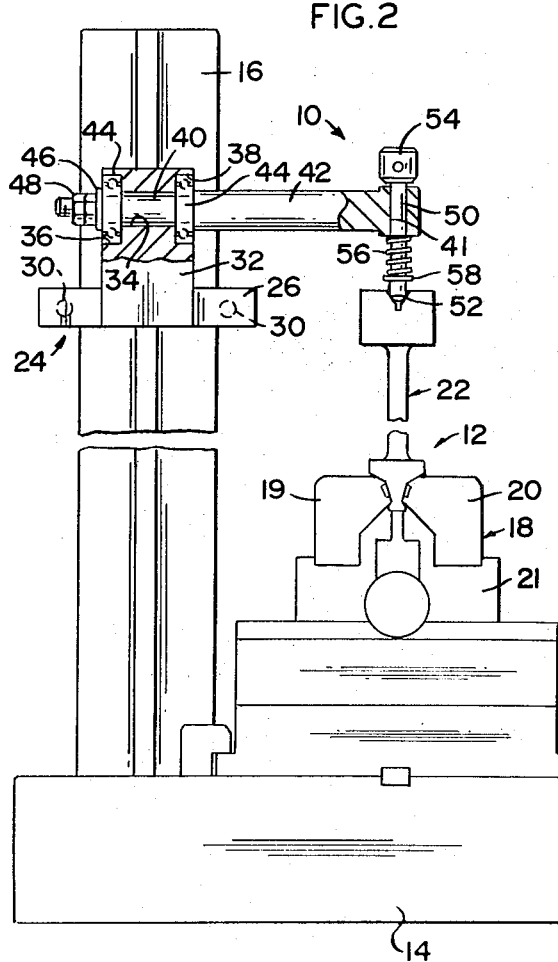
FIG. 2 is a broken side elevation, partly in section, of the apparatus of FIG. 1.
Figure 3:
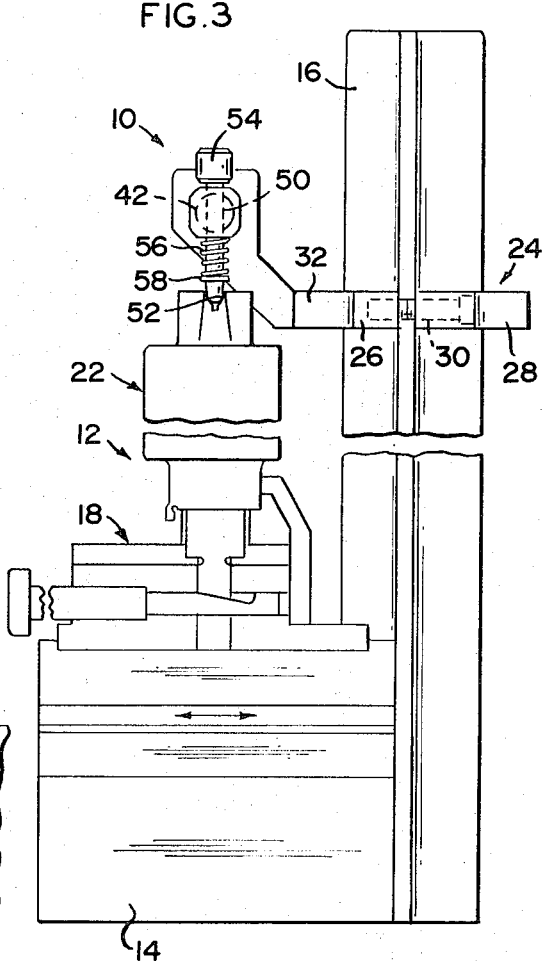
FIG. 3 is a fragmentary front elevation of the apparatus of FIG. 1.

This invention, as one embodiment thereof, relates to a gauge adapter for use in a gauge including a base with test article positioning means thereon, and an upright secured to the base, the gauge adapter comprising a support means attachable to the upright and adjustable vertically thereon, a support arm journalled in the support means and positioned horizontally, a locater pin resiliently carried by the support arm and extending perpendicular thereto, which locater pin is engageable with the upper end of a test article secured to the base and extending upwardly therefrom, the locater pin being movable in an arc in a vertical plane including the center line of a test article.

With reference to the details of the structure shown in the drawings, a gauge adapter is indicated as a whole by the numeral 10. This gauge adapter for use with any type of a gauge having uprights thereon and generally being of the class referred to hereinbefore. Particularly, a gauge is indicated by the numeral 12 and this gauge includes a base 14 having one or more uprights 16 suitably secured thereto and extending upwardly therefrom. The uprights 16 may carry suitable gauge means thereon for checking the test article. The gauge normally is supported by the base 14 and any known type of article engaging or positioning means are provided on the base 14 and are indicated diagrammatically by a member 18 operably positioned on the base 14. The member 18 includes at least a pair of opposed jaws 19 and 20 or similar means that will engage a test article of any type such as a turbine blade 22. The jaws 19 and 20 are adjustable and are carried by a support 21 on the gauge in a conventional manner. The test article is supported on the base of the gauge in a vertical position. Normally, these test articles 22 are relatively elongate, thin members or articles and the jaws firmly engage the article 22 to secure its lower end in position. But slight movement of the article 22 parallel to the jaws, or the upper end of the article may be had in the gauge.

The actual gauge adapter 10 of the invention includes a suitable support means 24 which in this instance may comprise a plate 26 that is attachable to the upright 16 as by an attaching member or cap 28 and cap screws 30 as indicated best in FIG. 1 of the drawings. Such support means or plate 26 in the embodiment of the invention shown has an additional support or bracket 32 suitably secured thereto or formed as a unit therewith and extending upwardly therefrom. Such plate or bracket 32 has an aperture or bore 34 extending therethrough with counterbored ends 36 and 38. Such bore 34 is adapted to receive a reduced diameter shaft or end 40 of a support arm 42. For facilitating low friction rotary movement of the support arm on its own axis, a pair of ball or roller bearings 44 are used to position the support arm 42 on the bracket 32 and normally a washer 46 is provided at the end of the outer bearing 44 with the support arm being secured to the bracket 32 as by lock or securing nuts 48. A shoulder on the support arm retains the other bearing in place. It will be seen that the support arm 42 is horizontally positioned when the base 14 of the gauge is positioned on a flat surface or it can be considered that the axis of the support arm 42 is parallel to the axis of the base 14.

As an important element of the present invention, the support arm 42 resiliently and adjustably positions a locater pin 50 thereon. Such locater pin 50 is positioned perpendicular to the longitudinal axis of the support arm 42 and the locater pin 50 is movable in a vertical plane by arcuate movement of the support arm in the bracket 32. The locater pin has any suitable contour at its lower end and it is adapted to engage with a centering recess 52 provided on the upper end of the test article 22. The locater pin 50 has a head 54 usually suitably removably secured thereto to aid in retaining the pin in engagement with the support arm 42 as it is slidably engaged with a bore 41 in such arm 42. The locater pin also is resiliently urged in one direction with relation to the support arm as by means of a coil spring 56 carried by the locater pin and having one end bearing on the support arm 42. The opposite end of the spring 56 seats on a suitable member such as a split ring or washer 58 suitably engaged with a groove or recess provided in the locater pin 50.

The locater pin 50 is provided in the apparatus so that it is positioned on a center line of the test article. By adjusting the thicknesses of the washer 46 used in positioning the support arm on the bracket 32, the axial relationship of the locater pin to the center line of the test article can be adjusted.

The test article 22 is diagrammatically shown in FIG. 1.

Hence, by the present invention, a relatively uncomplicated but positive acting gauge adapter has been provided. This adapter permits some movement of a test article or the upper end thereof in one plane to facilitate gauging action on this test article while firmly secured in position by means engaging the lower end of the test article and carried on the base of the gauge. The test article 22 as shown is elongate and thin in one dimension. It can be moved in the plane of such small or thin dimension. Thus, the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A gauge adapter carried by a gauge including a base defining a horizontal plane and including test article positioning means thereon, and an upright secured to said base, said gauge adapter comprising a support means attachable to said upright, a support arm rotatably journalled in said support means, said support arm having a longitudinal axis positioned parallel to the plane of the base, said support arm being positioned for rotation about said axis, a locater pin carried by said support arm and positioned perpendicular to the longitudinal axis thereof, said locater pin having an end engageable with the upper end of a test article secured to the base, said locater pin being rotatably movable with said support arm and with said pin moving in an arc defining a vertical plane including the center line of a test article secured to said test article positioning means.

2. The gauge adapter as in claim 1 where said support arm is adjustable longitudinally on said axis in relation to said support means by means operatively securing said support arm to said support means.

3. A gauge adapter as in claim 1 and including a coil spring means encompassing and engaging said locater pin and biasing said end away from said support arm, said support arm having a bore extending perpendicular to its longitudinal axis in which bore said locater pin is slidably positioned.

4. A gauge adapter as in claim 1 wherein said locater pin is slidably mounted in said support arm, a spring means on said locater pin being compressed between said support arm and a portion of said locater arm to urge said one end of said locater pin away from said support arm.

5. A gauge adapter as in claim 2 where means secure said support means to said upright to adjust said support means along said upright to vary the spacing of the gauge adapter from the base.

6. A gauge adapter as in claim 1 and particularly designed for gauging of elongate articles and where said test article positioning means retain the base of a test article against movement in a plane perpendicular to the plane of movement of said locater pin.

* * * * *